(12) United States Patent
Baek

(10) Patent No.: US 9,805,446 B2
(45) Date of Patent: Oct. 31, 2017

(54) METHOD OF CHANGING ALGORITHM AND ELECTRONIC DEVICE THEREFOR

(71) Applicant: Samsung Electronics Co., Ltd., Suwon-si, Gyeonggi-do (KR)

(72) Inventor: Woo-Hyun Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 14/466,294

(22) Filed: Aug. 22, 2014

(65) Prior Publication Data

US 2015/0067321 A1    Mar. 5, 2015

(30) Foreign Application Priority Data

Aug. 30, 2013    (KR) .................. 10-2013-0104444

(51) Int. Cl.

| | |
|---|---|
| *G06F 9/24* | (2006.01) |
| *G06F 15/177* | (2006.01) |
| *G06T 5/00* | (2006.01) |
| *H04N 5/232* | (2006.01) |
| *H04N 5/235* | (2006.01) |
| *G06F 9/455* | (2006.01) |
| *G06F 17/50* | (2006.01) |
| *H04M 15/00* | (2006.01) |
| *G06F 21/57* | (2013.01) |

(52) U.S. Cl.
CPC ............. *G06T 5/00* (2013.01); *H04N 5/2355* (2013.01); *H04N 5/23229* (2013.01); *H04N 5/23267* (2013.01); *G06F 9/455* (2013.01); *G06F 17/5022* (2013.01); *G06F 17/5045* (2013.01); *G06F 21/575* (2013.01); *H04M 15/61* (2013.01)

(58) Field of Classification Search
CPC .. G06F 9/455; G06F 17/5022; G06F 17/5045; G06F 21/575; H04M 15/61
USPC ................................................. 713/1, 2, 100
See application file for complete search history.

(56) References Cited

U.S. PATENT DOCUMENTS

| | | | |
|---|---|---|---|
| 9,223,415 B1 * | 12/2015 | Zhou .................. | G06K 9/00335 |
| 2009/0281639 A1 * | 11/2009 | McNab .................. | G05B 11/42 |
| | | | 700/7 |

* cited by examiner

*Primary Examiner* — Michael J Brown
(74) *Attorney, Agent, or Firm* — Jefferson IP Law, LLP

(57) ABSTRACT

A method of changing an algorithm used in an electronic device and an electronic device thereof are provided. The method includes determining an algorithm based on at least one of information about environments and information about a useful amount of resources, determining a variable of the determined algorithm based on the at least one of information about the environments and the information about the useful amount of resources, and executing the determined algorithm based on the determined variable of the algorithm.

21 Claims, 7 Drawing Sheets

METHOD OF CHANGING ALGORITHM AND ELECTRONIC DEVICE THEREFOR

CROSS-REFERENCE TO RELATED APPLICATION(S)

This application claims the benefit under 35 U.S.C. §119 (a) of a Korean patent application filed on Aug. 30, 2013 in the Korean Intellectual Property Office and assigned Serial number 10-2013-0104444, the entire disclosure of which is hereby incorporated by reference.

TECHNICAL FIELD

The present disclosure relates a method of changing an algorithm and the electronic device thereof.

BACKGROUND

Currently, as electronic devices such as smart phones and tablet Personal Computers (PCs) have been developed, they which may perform wireless voice communication and exchanging information as necessities of life. The electronic devices were originally recognized as portable devices which may simply perform wireless communication. However, as technologies of the electronic devices have developed and wireless internet has been introduced, the electronic devices have progressed from the portable devices which may simply perform wireless communication and have been developed into multimedia devices which may perform a plurality of functions, such as a scheduling function, a game function, a remote control function, an image capturing function, and a projector function, to satisfy needs of users thereof.

Particularly, each of the electronic devices has various sensors for acquiring information. These sensors are used to acquire information about motion, an internal environment, and an external environment of the electronic device. For one example, the electronic device may acquire information about the electronic device's internal and external temperatures using a temperature sensor. For another example, the electronic device may acquire latitude information of the electronic device's current position using a latitude sensor.

As described above, the electronic device may acquire various information using sensors installed therein. However, there is a problem in that the electronic device does not provide various methods of enhancing the electronic device's availability and convenience using the acquired information.

Accordingly, a method and apparatus for changing an algorithm based on resource information, motion information, and environment information of an electronic device in the electronic device is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for changing an algorithm based on resource information, motion information, and environment information of an electronic device in the electronic device.

Another aspect of the present disclosure is to provide a method and apparatus for variably operating a software algorithm based on information acquired using a sensor in an electronic device.

In accordance with an aspect of the present disclosure, a control method of an electronic device is provided. The control method includes determining an algorithm based on at least one of information about environments and information about a useful amount of resources, determining a variable of the determined algorithm based on the at least one of information about the environments and the information about the useful amount of resources, and executing the determined algorithm based on the determined variable of the algorithm.

In accordance with another aspect of the present disclosure, an electronic device is provided. The electronic device includes at least one processor, a touch-sensitive display, at least one sensor, a memory, and at least one program, each of the at least one program which is stored in the memory and is configured to be executable by each of the at least one processor, wherein each of the at least one program includes an instruction for determining an algorithm based on at least one of information about environments and information about a useful amount of resources, determining a variable of the determined algorithm based on at least one of the information about the environments and the information about the useful amount of resources, and executing the determined algorithm based on the determined variable of the algorithm.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an electronic device may be any one of a mobile communication terminal, a smart phone, a tablet PC, a digital camera, a Moving Picture Experts Group (MPEG) layer 3 (MP3) player, a navigation device, a laptop, a netbook, a computer, a television, a refrigerator, an air conditioner, etc., each of them having at least one sensor.

Figure 1:
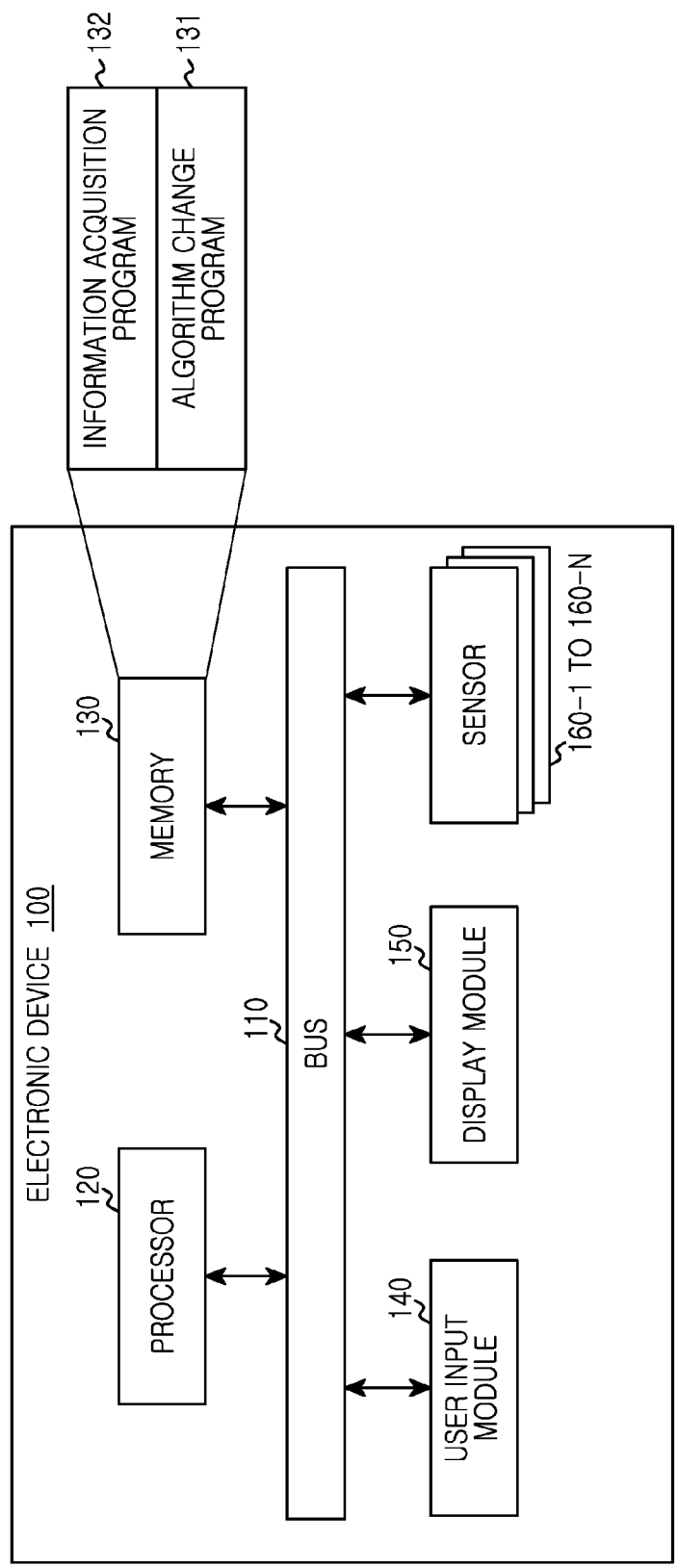
FIG. 1 is a block diagram illustrating configuration of an electronic device for changing an algorithm according to an embodiment of the present disclosure.

FIG. 1 is a block diagram illustrating configuration of an electronic device for changing an algorithm according to an embodiment of the present disclosure.

Referring to FIG. 1, an electronic device denoted by 100 includes a bus 110, a processor 120, a memory 130, a user input module 140, a display module 150, and at least one sensor 160-1 to 160-N, but is not limited thereto. Herein, the processor 120 and the memory 130 may be a plurality of processors and memories, respectively.

The bus 110 connects components included in the electronic device 100 to each other and controls communication between components included in the electronic device 100.

The processor 120 performs a control operation to various services in the electronic device 100. For example, the processor 120 may decode a command received from at least at least one component (e.g., the memory 130, the user input module 140, the display module 150, and at least the one sensor 160-1 to 160-N) included in the electronic device 100 through the bus 110 and execute a calculation and/or data processing according to the decoded command.

The processor 120 performs a control operation to execute at least one program stored in the memory 130 and provides various services in the electronic device 100. The processor 120 according to an embodiment of the present disclosure controls an information acquisition program 132 to select an algorithm to be changed based on information about environments, which is acquired from at least the one sensor 160-1 to 160-N, and information about a useful amount of resources, which is acquired through a calculation that may be predetermined. The information about environments may include information related to an external environment of the electronic device 100 and information related to an internal environment of the electronic device 100. For example, the information related to the external environment may include information such as an external temperature, external humidity, external illumination, and external heat of the electronic device 100, acceleration by movement of the electronic device 100, gravity for the electronic device 100, a position of the electronic device 100, a rotational degree of the electronic device 100, and metadata of an image photographing an external environment. The information related to the internal environment may include information such as an internal temperature, internal humidity, and internal heat of the electronic device 100. The information about the useful amount of resources may include information such as a useful amount of a Central Processing Unit (CPU) of the electronic device 100 and a useful amount of a battery of the electronic device 100.

The processor 120 may select an algorithm to be changed using a table indicating mapping relation between information about environments and/or information about a useful amount of resources and an algorithm. An algorithm which may be changed based on information about environments and information about a useful amount of resources may be an algorithm related to a subprogram (e.g., a plugin) which is included and executed in a specific program. For example, the algorithm which may be changed based on the information about the environments and the information about the useful amount of resources may include at least one algorithm related to image processing functions such as a Video Digital Image Stabilization (VDIS) function, a Low Light Video (LLV) function, and a High Dynamic Range (HDR) function. The processor 120 controls the algorithm change program 131 to change at least one variable value in a selected algorithm and execute the algorithm in which the variable value is changed.

The memory 130 stores commands or data which are received from at least one component (e.g., the processor 120, the user input module 140, the display module 150, and at least the one sensor 160-1 to 160-N) included in the electronic device 100 or are generated by the at least one component. For example, the memory 130 may store information about output characteristics of peripherals which may be connected to the electronic device 100 and information of an application program recognized as a virtual device.

The memory 130 stores at least one program for services of the electronic device 100. For example, the memory 130 may include at least one of the information acquisition program 132 and the algorithm change program 131.

The information acquisition program 132 may include at least one software component for acquiring information about environments and information about a useful amount of resources of the electronic device 100. First of all, the information acquisition program 132 may acquire information about an internal environment and an external environment of the electronic device 100 through at least the one sensor 160-1 to 160-N. Herein, at least the one sensor 160-1 to 160-N may include at least one of a gyro sensor, an acceleration sensor, a temperature sensor, a humidity sensor, an illumination sensor, a latitude sensor, and a longitude sensor. For example, when at least the one sensor included in the electronic device 100 is the temperature sensor, the information acquisition program 132 may acquire internal temperature information and external temperature information of the electronic device 100 using the corresponding temperature sensor. For another example, when at least the one sensor included in the electronic device 100 is the illumination sensor, the information acquisition program 132 may acquire external illumination information of the electronic device 100 using the corresponding illumination sensor.

In addition, the information acquisition program 132 may acquire information about a useful amount of resources of the electronic device 100 through a calculation that may be predetermined or module. For one example, the information acquisition program 132 may acquire information about a useful amount of a CPU of the electronic device 100 through a specific calculation that may be predetermined. For another example, the information acquisition program 132 may acquire information about a useful amount of a battery of the electronic device 100 through a stored module.

The algorithm change program 131 may include at least one software component for selecting an algorithm to be changed based on the information about the environments and the information about the useful amount of resources, which are acquired by the information acquisition program 132. That is, the algorithm change program 131 may determine whether to change a certain algorithm according to the information acquired by the information acquisition program 132. For one example, when the information acquired by the information acquisition program 132 is temperature information, the algorithm change program 131 may select a first algorithm mapped to a temperature in a previously stored mapping table. For another example, when the information acquired by the information acquisition program 132 is height information, the algorithm change program 131 may select a second algorithm mapped to a height in the previously stored mapping table. For another example, when the information acquired by the information acquisition program 132 is position information and acceleration information, the algorithm change program 131 may select a third algorithm mapped to the position information and the acceleration information in the previously stored mapping table. For another example, when a useful amount of a first CPU of the electronic device 100 is greater than a useful amount of threshold resources as a result of verifying the information about the useful amount of resources, which are acquired by the information acquisition program 132, the algorithm change program 131 may select a resource allocation algorithm for the first CPU, change the selected resource allocation algorithm, and allocate resources allocated to the first CPU to another CPU.

In addition, the algorithm change program 131 may determine at least one variable to change the algorithm change program 131's value, based on the information acquired by the information acquisition program 132 among a plurality of variables used in the selected algorithm. In addition, the algorithm change program 131 may determine a value of a variable to be changed in the selected algorithm according as the information acquired by the information acquisition program satisfies a criterion that may be predetermined. In addition, the algorithm change program 131 may determine a value of a variable in the selected algorithm according as the acquired information corresponds to any criterion among a plurality of criteria. The algorithm change program 131 may perform calculation based on the acquired information and determine a value of a variable to be changed, or may determine a value of a variable to be changed as a value of a variable previously mapped to the acquired information. The algorithm change program 131 may change a value of a variable and execute the selected algorithm using the changed variable. When the acquired information does not satisfy a criterion, the algorithm change program 131 may not change a value of a variable of the selected algorithm and execute an algorithm using a value with respect to the corresponding variable. For example, variables of an algorithm for processing images may include at least one of a number of frames to be synthesized, the number of threads, an exposure correction degree, noise reduction strength, a motion compensation degree, a number of HDR synthesis, object motion, and illumination. For example, when information acquired from an illumination sensor is less than threshold illumination information, the algorithm change program 131 may select a first algorithm mapped to illumination information and change the number of frames used in the first algorithm.

In addition, the algorithm change program 131 may determine a complexity of the selected algorithm based on the acquired information. Assuming that a complexity of a basic algorithm in a state where a variable is not changed is 100, the complexity of the algorithm means how complicated the corresponding algorithm is in comparison to a conventional algorithm is indicated as a numeric number. The complexity of the algorithm may be determined according to a number of steps comprising an algorithm and values of variables.

In addition, the algorithm change program 131 may determine a variable to be changed and/or a step to be omitted according to the determined complexity. That is, the algorithm change program 131 may verify a mapping table in which the complexity and the variable to be changed and/or the step to be omitted are mapped with each other and determine the variable to be changed and/or the step to be omitted according to the determined complexity.

The user input module 140 may transmit commands or data generated by selection of a user of the electronic device 100 to the processor 120 through the bus 110. For example, the user input module 140 may include at least one of a keypad (not illustrated) including at least one hardware button and a touch pad which may sense touch information.

The display module 150 displays videos, images, or data to the user. The display module 150 may display a notification message indicating that a function executed by a changed algorithm may be changed.

At least the one sensor 160-1 to 160-N may be included in the electronic device 100 and acquire information an internal environment and an external environment of the electronic device 100. Herein, at least the one sensor 160-1 to 160-N may include at least one of a gyro sensor, an acceleration sensor, a temperature sensor, a humidity sensor, an illumination sensor, a latitude sensor, and a longitude sensor, but are not limited thereto.

As shown in FIG. 1, in accordance with an embodiment of the present disclosure, the description was given for the method of changing the algorithm based on the method of executing the algorithm change program 131 and the information acquisition program 132 which are stored in the memory 130 at the processor 120.

Figure 2:
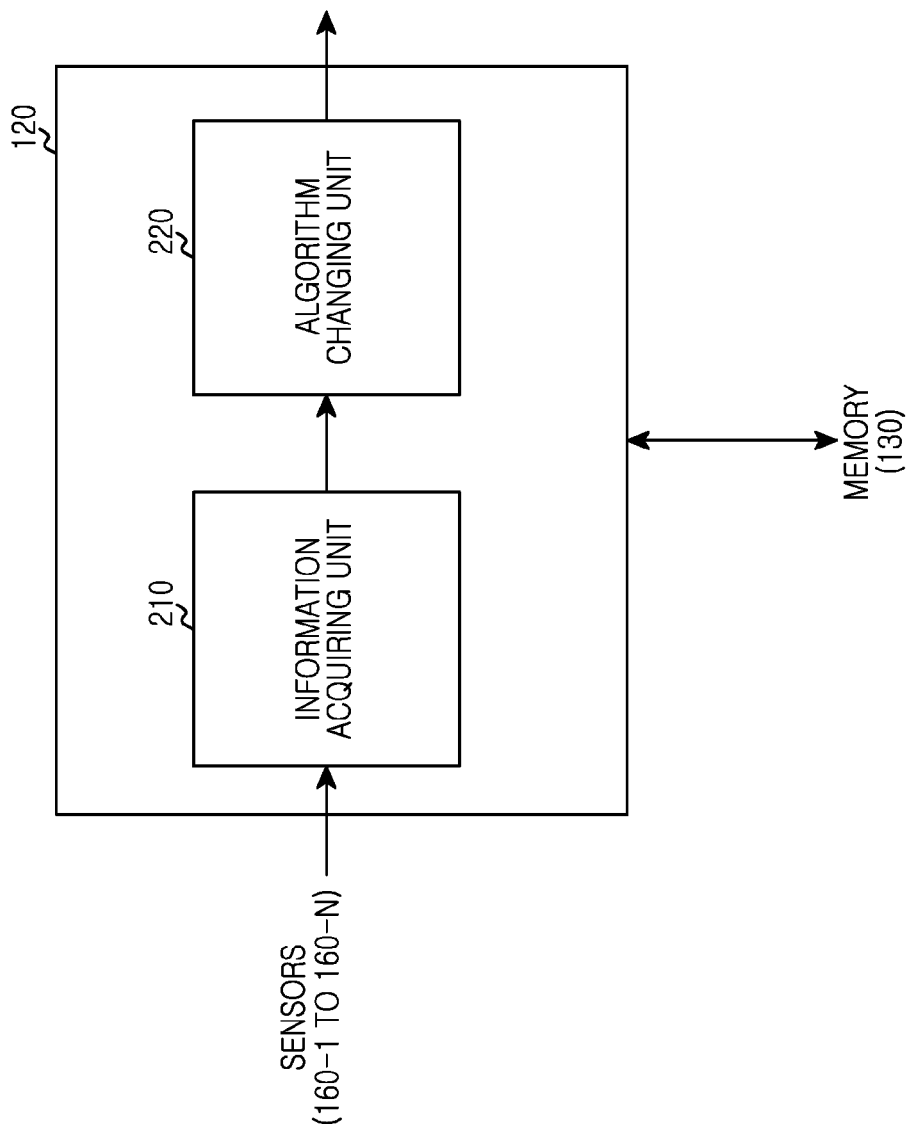
FIG. 2 is a block diagram illustrating detailed configuration of a processor of an electronic device for changing an algorithm according to an embodiment of the present disclosure.

However, as shown in FIG. 2, in accordance with another embodiment of the present disclosure, the processor 120 of the electronic device 100 may change an algorithm.

FIG. 2 is a block diagram illustrating detailed configuration of a processor of an electronic device for changing an algorithm according to an embodiment of the present disclosure.

Referring to FIGS. 1 and 2, the processor 120 includes an information acquiring unit 210 and an algorithm changing unit 220.

The information acquiring unit 210 may include at least one software component for acquiring information about environments and information about a useful amount of resources of the electronic device 100. First of all, the information acquiring unit 210 may acquire information about an internal environment and an external environment of the electronic device 100 through at least the one sensor 160-1 to 160-N. Herein, at least the one sensor 160-1 to 160-N may include at least one of a gyro sensor, an acceleration sensor, a temperature sensor, a humidity sensor, an illumination sensor, a latitude sensor, and a longitude sensor, but are not limited thereto. For one example, when at least the one sensor included in the electronic device 100 is the temperature sensor, the information acquiring unit 210 may acquire internal temperature information and external temperature information of the electronic device 100 using the corresponding temperature sensor. For another example, when at least the one sensor included in the electronic device 100 is the illumination sensor, the information acquiring unit 210 may acquire external illumination information of the electronic device 100 using the corresponding illumination sensor.

In addition, the information acquiring unit 210 may acquire information about a useful amount of resources of the electronic device 100 through a predetermined calculation or module. For one example, the information acquiring unit 210 may acquire information about a useful amount of a CPU of the electronic device 100 through a specific calculation that may be predetermined. For another example, the information acquiring unit 210 may acquire information about a useful amount of a battery of the electronic device 100 through a stored module.

The algorithm changing unit 220 may include at least one software component for selecting an algorithm to be changed based on the information about the environments and the information about the useful amount of resources, which are acquired by the information acquiring unit 210. That is, the algorithm changing unit 220 may determine whether to change a certain algorithm according to the information acquired by the information acquiring unit 210. For one example, when the information acquired by the information acquiring unit 210 is temperature information, the algorithm changing unit 220 may select a first algorithm mapped to a temperature in a previously stored mapping table. For another example, when the information acquired by the information acquiring unit 210 is height information, the algorithm changing unit 220 may select a second algorithm mapped to a height in the previously stored mapping table. For another example, when the information acquired by the information acquiring unit 210 is position information and acceleration information, the algorithm changing unit 220 may select a third algorithm mapped to the position information and the acceleration information in the previously stored mapping table. For another example, when a useful amount of a first CPU is greater than a useful amount of threshold resources as a result of verifying the information about the useful amount of resources, which is acquired by the information acquiring unit 210, the algorithm changing unit 220 may select a resource allocation algorithm for the first CPU, change the selected resource allocation algorithm, and allocate resources allocated to the first CPU to another CPU.

In addition, the algorithm changing unit 220 may determine at least one variable to change value of the determined at least one variable, based on the information acquired by the information acquiring unit 210 among a plurality of variables used in the selected algorithm. In addition, the algorithm changing unit 220 may determine a value of a variable to be changed in the selected algorithm according as the information acquired by the information acquiring unit 210 satisfies a criterion that may be predetermined. In addition, the algorithm changing unit 220 may determine a value of a variable in the selected algorithm according as the acquired information corresponds to any criterion among a plurality of criteria that may be predetermined. The algorithm changing unit 220 may perform a calculation based on the acquired information and determine a value of a variable to be changed, or may determine a value of a variable to be changed as a value of a variable previously mapped to the acquired information. The algorithm changing unit 220 may change a value of a variable and execute the selected algorithm using the changed variable. When the acquired information does not satisfy a criterion that may be predetermined, the algorithm changing unit 220 may not change a value of a variable of the selected algorithm and execute an algorithm using a value that may be predetermined with respect to the corresponding variable. For example, variables of an algorithm for processing images may include at least one of a number of frames to be synthesized, the number of threads, an exposure correction degree, noise reduction strength, a motion compensation degree, the number of HDR synthesis, object motion, and illumination. For example, when information acquired from an illumination sensor is less than threshold illumination information, the algorithm changing unit 220 may select a first algorithm mapped to illumination information and change the number of frames used in the first algorithm.

In addition, the algorithm changing unit 220 may determine a complexity of the selected algorithm based on the acquired information. Assuming that complexity of a basic algorithm in a state where a variable is not changed is 100, the complexity of the algorithm means how complicated the corresponding algorithm is in comparison to a conventional algorithm as indicated by a numeric number. The complexity of the algorithm may be determined according to the number of steps comprising an algorithm and values of variables.

In addition, the algorithm changing unit 220 may determine a variable to be changed and/or a step to be omitted according to the determined complexity. That is, the algorithm changing unit 220 may verify a mapping table in which the complexity and the variable to be changed and/or the step to be omitted are mapped with each other and determine the variable to be changed and/or the step to be omitted according to the determined complexity.

Figure 3A:
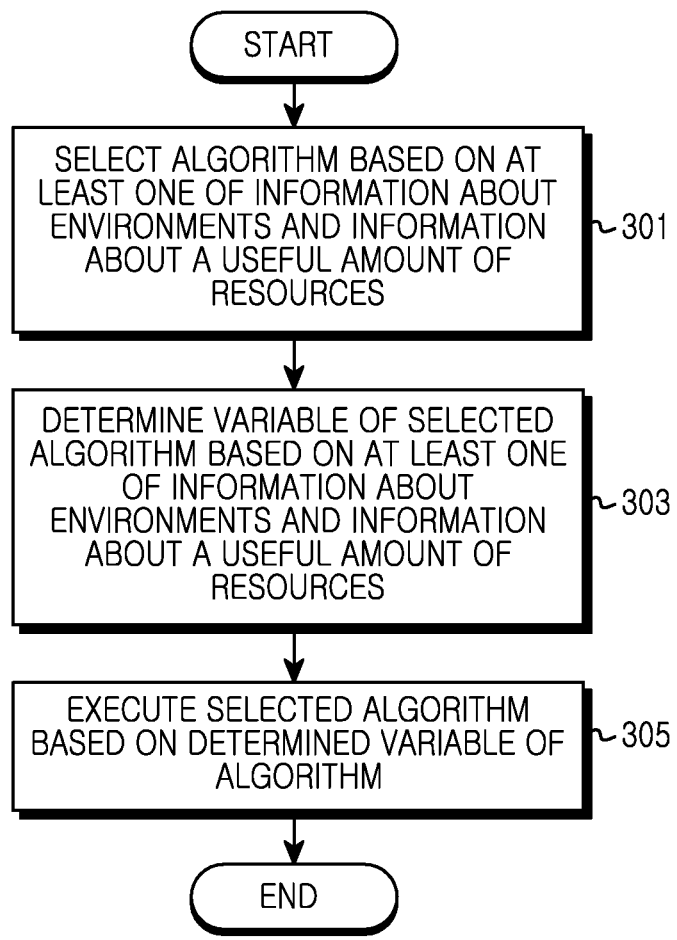
FIG. 3A is a flowchart illustrating a process of variably operating an algorithm in an electronic device according to an embodiment of the present disclosure.

FIG. 3A is a flowchart illustrating a process of variably operating an algorithm in an electronic device according to an embodiment of the present disclosure.

Referring to FIGS. 1 and 3A, the electronic device 100 may select an algorithm based on at least one of information about environments and information about a useful amount of resources in operation 301. In more detail, the electronic device 100 may select the algorithm based on at least one of information about environments, which is acquired through at least the one sensor 160-1 to 160-N included in the electronic device 100, and information about a useful amount of resources of the electronic device, which is acquired through a calculation. For example, the electronic device 100 may select at least one algorithm related to image processing functions such as a VDIS function, an LLV function, and an HDR function based on at least one of the information about the environments and the information about the useful amount of resources.

The electronic device 100 may proceed to operation 303 and determine a variable of the selected algorithm based on at least one of the information about the environments and the information about the useful amount of resources. That is, the electronic device 100 may determine a value of a variable to be changed in the selected algorithm according as the information about the environments and the information about the useful amount of resources correspond to a certain criterion among a plurality of criteria that may be predetermined. Also, the electronic device 100 may perform a calculation based on the acquired information and determine a value of a variable to be changed, and may determine a value of a variable to be changed as a value of a variable previously mapped to the acquired information.

The electronic device 100 may proceed to operation 305 and execute the selected algorithm based on the determined variable of the algorithm. Thereafter, the electronic device 100 ends the processes according to an embodiment of the present disclosure.

Figure 3B:
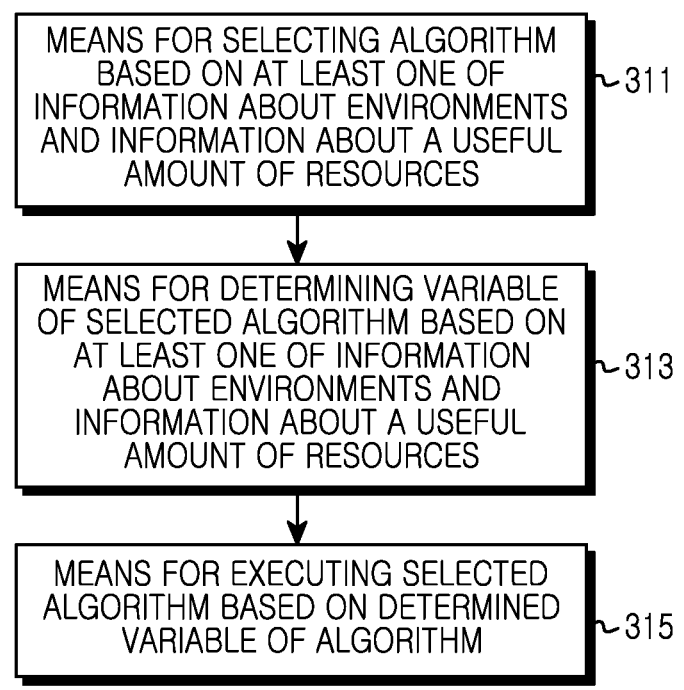
FIG. 3B is a block diagram illustrating configuration of an electronic device for variably operating an algorithm according to an embodiment of the present disclosure.

FIG. 3B is a block diagram illustrating configuration of an electronic device for variably operating an algorithm according to an embodiment of the present disclosure.

Referring to FIGS. 1 and 3B, the electronic device 100 includes a means 311 for selecting an algorithm based on at least one of information about environments and information about a useful amount of resources. Herein, at least the one sensor 160-1 to 160-N includes at least one of a gyro sensor, an acceleration sensor, a temperature sensor, a humidity sensor, an illumination sensor, a latitude sensor, and a longitude sensor.

In addition, the electronic device 100 includes a means 313 for determining a variable of the selected algorithm based on at least one of the information about the environments and the information about the useful amount of resources. The electronic device 100 may include a means for storing a mapping table in which the information about the environments and the information about the useful amount of resources and variables of the algorithm are mapped to each other. Also, the electronic device 100 may include a means for determining a complexity of the algorithm based on at least one of the information about the environments and the information about the useful amount of resources.

In addition, the electronic device 100 may include a means 315 for executing the selected algorithm based on the determined variable of the algorithm.

Figure 4:
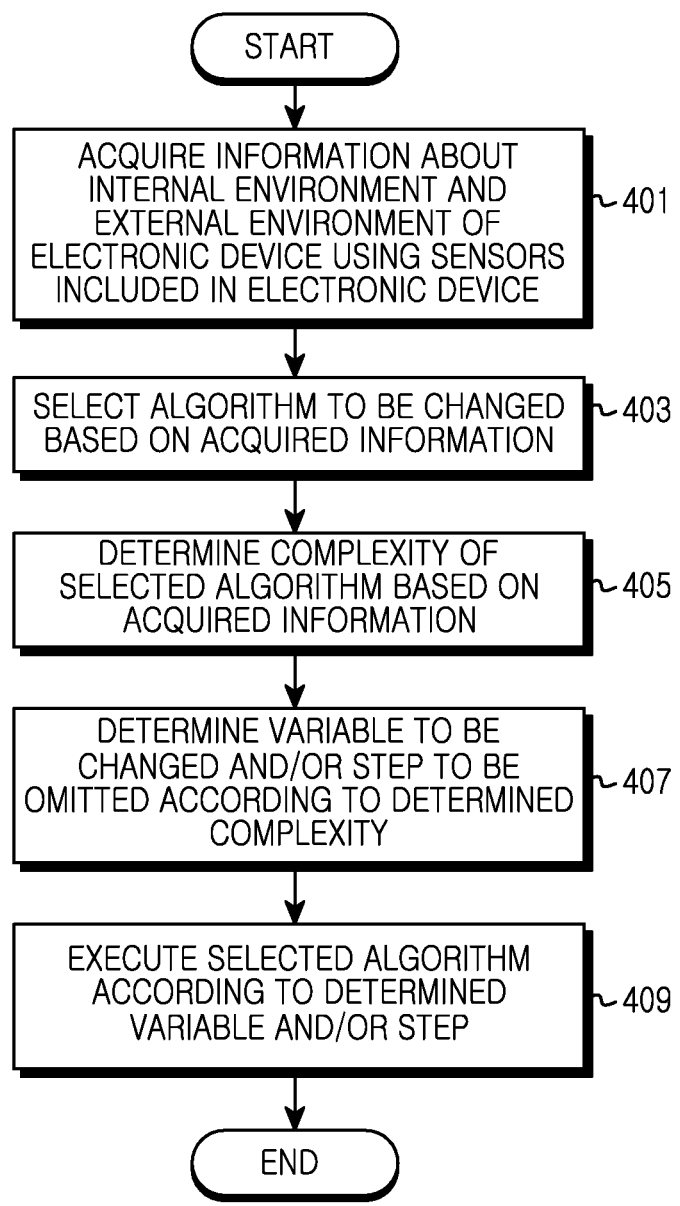
FIG. 4 is a flowchart illustrating a process of determining a complexity of an algorithm based on information acquired using at least one sensor in an electronic device according to an embodiment of the present disclosure.

FIG. 4 is a flowchart illustrating a process of determining a complexity of an algorithm based on information acquired using at least one sensor in an electronic device according to an embodiment of the present disclosure.

Referring to FIGS. 1 and 4, the electronic device 100 may acquire information about an internal environment and an external environment thereof using sensors included therein in operation 401. That is, the electronic device 100 may acquire the information about the internal environment and the external environment thereof through at least the one sensor 160-1 to 160-N included therein. Herein, at least the one sensor 160-1 to 160-N may include at least one of a gyro sensor, an acceleration sensor, a temperature sensor, a humidity sensor, an illumination sensor, a latitude sensor, and a longitude sensor.

The electronic device 100 may proceed to operation 403 and select an algorithm to be changed based on the acquired information. For one example, the electronic device 100 may verify a previously stored mapping table indicating mapping relation between information about environments and each of a plurality of algorithms used in therein and select an algorithm corresponding to the acquired information. For another example, the electronic device 100 may perform a calculation, that may be predetermined, based on the acquired information and select an algorithm corresponding to the acquired information. For another example, the electronic device 100 may select an algorithm corresponding to the acquired information using the acquired information and a previously stored module. An algorithm which may be changed based on information about environments according to an embodiment of the present disclosure may be an algorithm related to a subprogram (e.g., a plugin) which is included and executed in a specific program. For example, the algorithm which may be changed based on information about environments and information about a useful amount of resources may include at least one algorithm related to image processing functions such as a VDIS function, an LLV function, and an HDR function.

The electronic device 100 may proceed to operation 405 and determine a complexity of the selected algorithm based on the acquired information. Assuming that complexity of a basic algorithm in a state where a variable is not changed is 100, the complexity of the algorithm means how complicated the corresponding algorithm is in comparison to a conventional algorithm is indicated as a numeric number. The complexity of the algorithm may be determined according to the number of steps comprising the algorithm and values of variables.

The electronic device 100 may proceed to operation 407 and determine a variable to be changed and/or a step to be omitted according to the determined complexity. That is, the electronic device 100 may verify a mapping table in which the complexity and the variable to be changed and/or the step to be omitted are mapped with each other and determine the variable to be changed and/or the step to be omitted according to the determined complexity. For one example, when complexity of a first algorithm is determined as "50", the electronic device 100 may verify a mapping table in which the complexity and a variable to be changed and/or a step to be omitted are mapped and determine the number of frames to be synthesized, that is, 3 as the variable to be changed. For another example, when complexity of a second algorithm is determined as 40, the electronic device 100 may verify a mapping table in which the complexity and a variable to be changed and/or a step to be omitted are mapped and determine a third step as the step to be omitted.

The electronic device 100 may proceed to operation 409 and execute the selected algorithm according to the determined variable and/or step. Thereafter, the electronic device 100 may end the processes according to an embodiment of the present disclosure.

Figure 5:
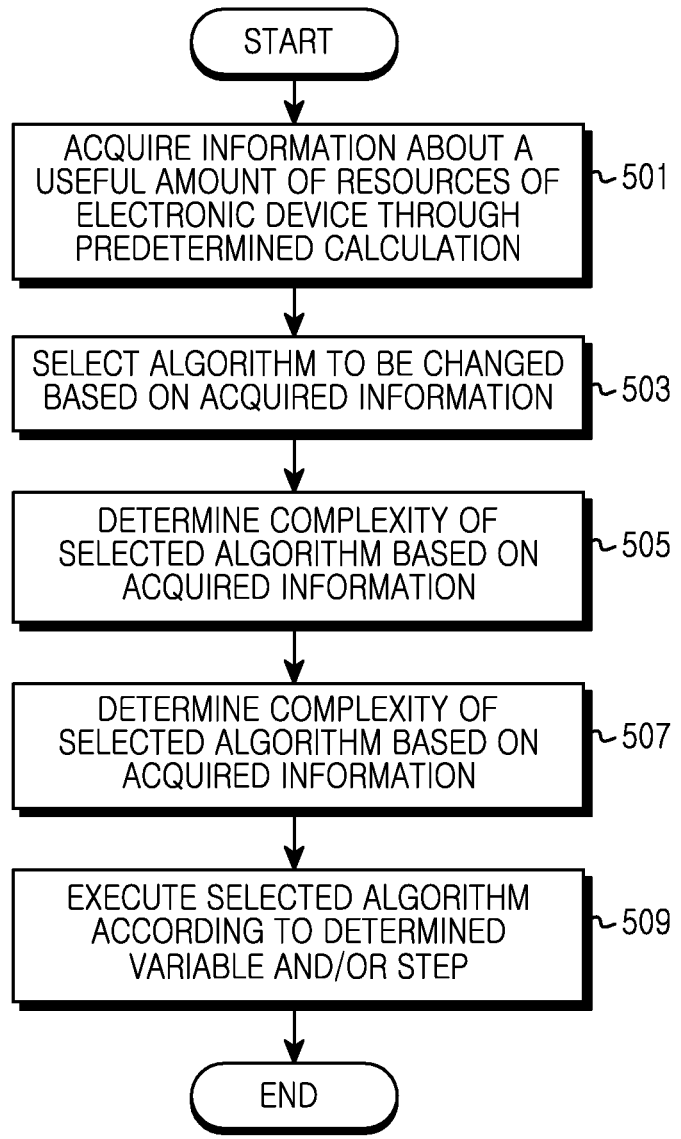
FIG. 5 is a flowchart illustrating a process of determining a complexity of an algorithm based on a useful amount of resources in an electronic device according to an embodiment of the present disclosure.

FIG. 5 is a flowchart illustrating a process of determining a complexity of an algorithm based on a useful amount of resources in an electronic device according to an embodiment of the present disclosure.

Referring to FIGS. 1 and 5, the electronic device 100 may acquire information about a useful amount of resources thereof through a calculation that may be predetermined in operation 501. For one example, the electronic device 100 may acquire information about a useful amount of a CPU thereof through a calculation that may be predetermined. For another example, the electronic device 100 may acquire information about a useful amount of a battery thereof through a specific calculation of a module that may be predetermined.

The electronic device 100 may proceed to operation 503 and select an algorithm to be changed based on the acquired information. For one example, the electronic device 100 may verify a previously stored mapping table with respect to the information about the useful amount of resources and an algorithm and select an algorithm corresponding to the acquired information. For another example, the electronic device 100 may perform a calculation that may be predetermined based on the acquired information and select an algorithm corresponding to the acquired information. For another example, the electronic device 100 may select an algorithm corresponding to the acquired information using the acquired information and a previously stored module. An algorithm which may be changed based on information about a useful amount of resources according to an embodiment of the present disclosure may be an algorithm related to a subprogram (e.g., a plugin) which is included and executed in a specific program. For example, the algorithm which may be changed based on information about environments and information about a useful amount of resources may include at least one algorithm related to image processing functions such as a VDIS function, an LLV function, and an HDR function.

The electronic device 100 may proceed to operation 505 and determine a complexity of the selected algorithm based on the acquired information. Assuming that complexity of a basic algorithm in a state where a variable is not changed is 100, the complexity of the algorithm means how complicated the corresponding algorithm is in comparison to a conventional algorithm as a numeric number. The complexity of the algorithm may be determined according to the number of steps of the algorithm and values of variables.

The electronic device 100 may proceed to operation 507 and determine a variable to be changed and/or a step to be omitted according to the determined complexity. That is, the electronic device 100 may verify a mapping table in which the complexity and the variable to be changed and/or the step to be omitted are mapped and determine the variable to be changed and/or the step to be omitted according to the determined complexity. For one example, when complexity of a first algorithm is determined as "50", the electronic device 100 may verify a mapping table in which the complexity and a variable to be changed and/or a step to be omitted are mapped and determine a number of frames to be synthesized, that is, 3 as the variable to be changed. For another example, when complexity of a second algorithm is determined as 40, the electronic device 100 may verify a mapping table in which the complexity and a variable to be changed and/or a step to be omitted are mapped and determine a third step as the step to be omitted.

The electronic device 100 may proceed to operation 509 and execute the selected algorithm according to the determined variable and/or step. Thereafter, the electronic device 100 may end the processes according to an embodiment of the present disclosure.

Figure 6:
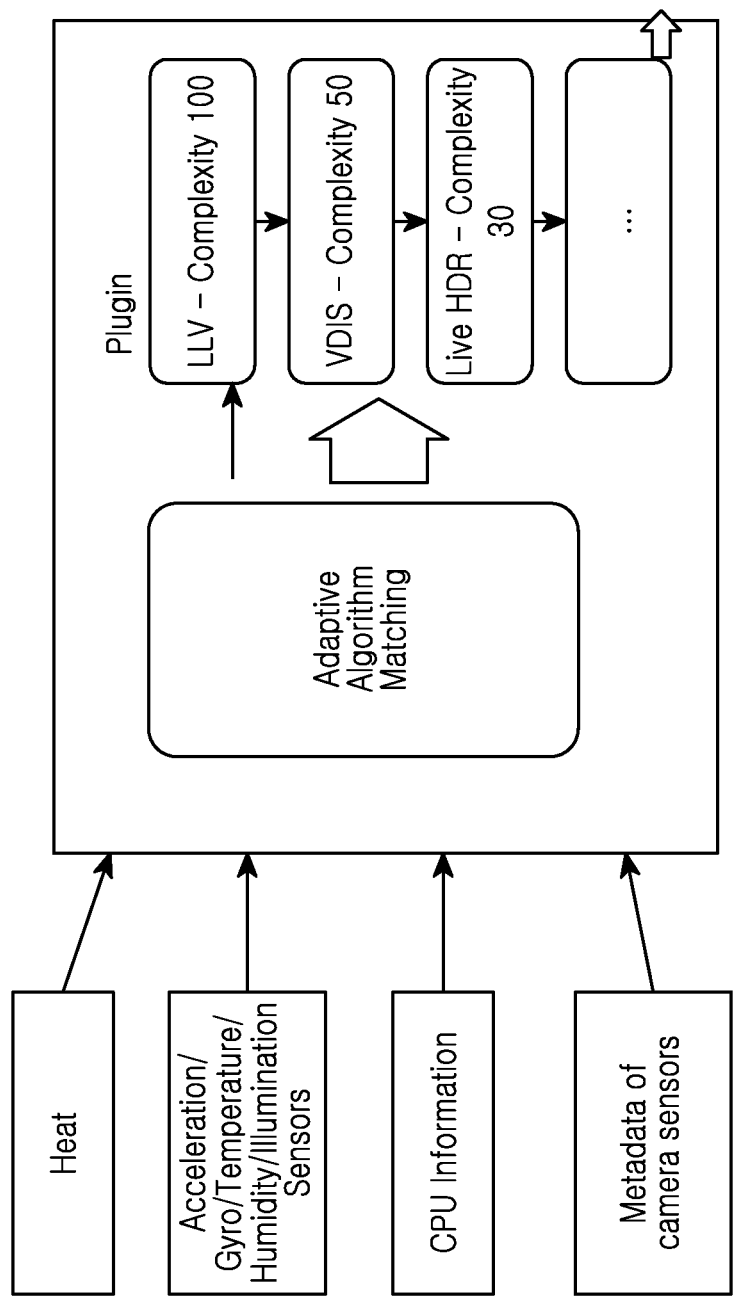
FIG. 6 illustrates a process of determining a complexity of an algorithm based on acquired information in an electronic device according to an embodiment of the present disclosure.

Selecting an algorithm based on information about environments and/or information about a useful amount of resources, when there are a plurality of algorithms mapped to acquired information, the electronic device 100 may adjust all of complexity of the plurality of corresponding algorithms. For example, selecting an algorithm based on information about environments and information about a useful amount of resources, when each of an LLV algorithm, a VDIS algorithm, and a live HDR algorithm is selected, the electronic device 100 may apply, as shown in FIG. 6, a weight to each of the algorithms according to acquired information about environments and acquired information about a useful amount of resources, maintain complexity of the LLV algorithm as "100", adjust complexity of the VDIS algorithm as "50", and adjust complexity of the live HDR algorithm as "30".

Various embodiments and all function operations of the present disclosure described in the specification of the present disclosure may be executed by computer software, firmware, or hardware, or the combination of at least one of them, which include structures disclosed in the specification of the present disclosure and equivalent structures of them. Also, various embodiments of the present disclosure described in the specification of the present disclosure may be implemented by at least one computer program product, that is, at least one module of computer program instructions, which are executed by data processing devices or are encoded on a computer readable medium for controlling operations of these devices.

The non-transitory computer readable medium may be a machine readable storage medium, a machine readable storage board, a memory device, composition of materials which have an influence on a machine readable propagation stream, or the combination of at least one of them. The term "data processing device" includes a programmable processor, a computer, or all devices, apparatuses, and machines, including a multi-processor or a computer, for processing data. The devices may include codes for being added in hardware and generating execution environments for a corresponding computer program, for example, codes configuring processor firmware, a protocol stack, a database management system, an operating system, or the combination of at least one of them.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   acquiring, by executing an information acquisition program stored in a memory, information detected via at least one sensor included in the electronic device and information associated with resource usage of the electronic device;
   determining an algorithm to be changed based on the information acquired by using the at least one sensor and information associated with the resource usage;
   determining a complexity of the algorithm based on the information acquired by using the at least one sensor and the information associated with the resource usage;
   executing the algorithm based on the determined complexity of the algorithm; and
   displaying, using a display, a message associated with a function executed by the algorithm,
   wherein the complexity of the algorithm is determined according to a number of steps comprising the algorithm and values of variables comprising the algorithm.

2. The method of claim 1, wherein the determination of the algorithm to be changed based on the information acquired by using the at least one sensor and the information associated with the resource usage comprises:
   searching for an algorithm corresponding to the information acquired by using the at least one sensor and the information associated with the resource usage from a table indicating a mapping relation between the the information acquired by using the at least one sensor and the information associated with the resource usage and at least one algorithm.

3. The method of claim 1, wherein the executing the algorithm based on the determined complexity of the algorithm comprises:
determining a variable of the algorithm according to the determined complexity of the algorithm; and
executing the algorithm based on the determined variable of the algorithm.

4. The method of claim 3, further comprising:
determining a step to be omitted among a plurality of steps comprising the algorithm, according to the determined complexity of the algorithm.

5. The method of claim 3, further comprising:
determining different complexity by applying a weight to each of a plurality of algorithms when the algorithm comprises the plurality of algorithms.

6. The method of claim 3, wherein the variable of the algorithm includes at least one of a number of frames to be synthesized, a number of threads, an exposure correction degree, noise reduction strength, a motion compensation degree, a number of HDR synthesis, object motion, or illumination.

7. The method of claim 3, wherein the determination of the variable of the algorithm according to the determined complexity of the algorithm comprises:
selecting at least one variable to change a value of the selected at least one variable in the algorithm based on the at least one of the information acquired by using the at least one sensor and the information associated with the resource usage,
determining whether the at least one of the information acquired by using the at least one sensor and the information associated with the resource usage satisfies at least one condition, and
determining a value of the selected at least one variable according to a condition satisfied by the at least one of the information acquired by using the at least one sensor or the information associated with the resource usage.

8. The method of claim 1, wherein the at least one sensor includes at least one of a gyro sensor, an acceleration sensor, a temperature sensor, a humidity sensor, an illumination sensor, a latitude sensor, or a longitude sensor.

9. The method of claim 1, wherein the information associated with the resource usage is information acquired through a calculation or module and includes at least one of Central Processing Unit (CPU) usage of the electronic device or battery usage of the electronic device.

10. The method of claim 1, wherein the algorithm comprises an image processing algorithm related to at least one of Video Digital Image Stabilization (VDIS), Low Light Video (LLV), or High Dynamic Range (HDR).

11. An electronic device comprising:
at least one processor;
a display;
at least one sensor;
a memory; and
at least one program, each of the at least one program which is stored in the memory and is configured to be executable by the at least one processor,
wherein each of the at least one program includes an instruction for:
acquiring information detected via the at least one sensor of the electronic device and information associated with resource usage of the electronic device,
determining an algorithm to be changed based on information acquired by using the at least one sensor and information associated with the resource usage,
determining a complexity of the algorithm based on the information acquired by using the at least one sensor and the information associated with the resource usage,
executing the algorithm based on the determined complexity of the algorithm, and
displaying, by the display, a message associated with a function executed by the algorithm, and
wherein the complexity of the algorithm is determined according to a number of steps comprising the algorithm and values of variables comprising the algorithm.

12. The electronic device of claim 11, wherein each of the at least one program comprises:
an instruction for searching an algorithm corresponding to the information acquired by using the at least one sensor and the information associated with the resource usage from a table indicating a mapping relation between the information acquired by using the at least one sensor and the information associated with the resource usage and at least one algorithm.

13. The electronic device of claim 11,
wherein each of the at least one program comprises an instruction for determining a variable of the algorithm according to the determined complexity of the algorithm, and
wherein the algorithm is executed based on the determined variable of the algorithm.

14. The electronic device of claim 13, wherein each of the at least one program further comprises an instruction for determining a step to be omitted among a plurality of steps comprising the algorithm according to the determined complexity of the algorithm.

15. The electronic device of claim 13, wherein each of the at least one program further comprises an instruction for determining different complexity by applying a weight to each of a plurality of algorithms when the algorithm comprises the plurality of algorithms.

16. The electronic device of claim 13, wherein the variable of the algorithm comprises at least one of a number of frames to be synthesized, a number of threads, an exposure correction degree, a noise reduction strength, a motion compensation degree, a number of HDR synthesis, an object motion, or an illumination.

17. The electronic device of claim 13, wherein each of the at least one program further comprises an instruction for:
selecting at least one variable to change a value of the selected at least one variable in the algorithm based on the information acquired by using the at least one sensor and the information associated with the resource usage,
determining whether the information acquired by using the at least one sensor and the information associated with the resource usage satisfies at least one condition, and
determining a value of the selected at least one variable according to a condition satisfied by the information acquired by using the at least one sensor and the information associated with the resource usage.

18. The electronic device of claim 11, wherein the at least one sensor comprises at least one of a gyro sensor, an acceleration sensor, a temperature sensor, a humidity sensor, an illumination sensor, a latitude sensor, or a longitude sensor.

19. The electronic device of claim 11, wherein the information associated with the resource usage is information acquired through a calculation or module and includes at least one of Central Processing Unit (CPU) usage of the electronic device or battery usage of the electronic device.

20. The electronic device of claim 11, wherein the algorithm is an image processing algorithm related to at least one of Video Digital Image Stabilization (VDIS), Low Light Video (LLV), or High Dynamic Range (HDR).

21. The electronic device of claim 11, wherein each of the at least one program comprises an instruction for determining a complexity of the algorithm based a number of steps comprising an algorithm and values of variables.

* * * * *